(12) United States Patent
Peng et al.

(10) Patent No.: US 11,018,725 B2
(45) Date of Patent: May 25, 2021

(54) DATA TRANSMISSION METHOD, APPARATUS, AND SYSTEM

(71) Applicant: Huawei Technologies Co., Ltd., Shenzhen (CN)

(72) Inventors: Jinlin Peng, Shanghai (CN); Haibao Ren, Shanghai (CN); Pengpeng Dong, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/672,840

(22) Filed: Nov. 4, 2019

(65) Prior Publication Data
US 2020/0083933 A1 Mar. 12, 2020

Related U.S. Application Data

(63) Continuation of application No. PCT/CN2018/085794, filed on May 7, 2018.

(30) Foreign Application Priority Data

May 5, 2017 (CN) .......................... 201710314216.9

(51) Int. Cl.
*H04B 7/024* (2017.01)
*H04L 1/18* (2006.01)
(52) U.S. Cl.
CPC ........... *H04B 7/024* (2013.01); *H04L 1/1864* (2013.01); *H04L 1/1896* (2013.01)

(58) Field of Classification Search
CPC ..... H04B 7/024; H04L 1/1864; H04L 1/1896; H04L 1/188; H04L 1/1893; H04L 1/0003; H04L 1/0009; H04L 5/00; H04L 1/0045; H04L 1/1657; H04L 5/0055
See application file for complete search history.

(56) References Cited

U.S. PATENT DOCUMENTS

| 10,476,641 | B2* | 11/2019 | Yang .................. H04L 5/0039 |
| 2004/0190540 | A1 | 9/2004 | Miyake et al. |
| 2012/0163357 | A1 | 6/2012 | Won et al. |
| 2014/0098770 | A1 | 4/2014 | Zhou et al. |
| 2014/0120929 | A1 | 5/2014 | Comeau et al. |

(Continued)

FOREIGN PATENT DOCUMENTS

| CN | 101820336 A | 9/2010 |
| CN | 102833053 A | 12/2012 |

(Continued)

*Primary Examiner* — Dac V Ha
(74) *Attorney, Agent, or Firm* — Slater Matsil, LLP

(57) ABSTRACT

This application relates to the field of wireless communications technologies, and in particular, to a data transmission method, an apparatus, and a system. Random access resource information: receiving, by user equipment UE, data from a first access network device to which a serving cell belongs; sending, by the UE, a decoding result of the data to the first access network device and a second access network device to which a coordinating cell belongs; and if the decoding result is negative acknowledgment NACK signaling, receiving, by the UE from the first access network device, the data that is retransmitted, and receiving, by the UE, the data from the second access network device.

17 Claims, 5 Drawing Sheets

Radio access network device 110

User equipment 130

Radio access network device 120

(56) References Cited

U.S. PATENT DOCUMENTS

| | | | |
|---|---|---|---|
| 2014/0293889 A1 | 10/2014 | Mahr et al. | |
| 2015/0358102 A1* | 12/2015 | Ko | H04L 5/0048 |
| | | | 370/252 |
| 2015/0365931 A1* | 12/2015 | Ng | H04L 1/1893 |
| | | | 370/329 |
| 2017/0094576 A1* | 3/2017 | Kazmi | H04W 72/0453 |
| 2017/0230086 A1 | 8/2017 | Chen et al. | |
| 2018/0192418 A1* | 7/2018 | Chen | H04W 72/0413 |
| 2020/0128576 A1* | 4/2020 | Jung | H04L 1/1861 |

FOREIGN PATENT DOCUMENTS

| | | |
|---|---|---|
| CN | 104488310 A | 4/2015 |
| CN | 105591721 A | 5/2016 |

\* cited by examiner

DATA TRANSMISSION METHOD, APPARATUS, AND SYSTEM

CROSS-REFERENCE TO RELATED APPLICATIONS

This application is a continuation of International Application No. PCT/CN2018/085794, filed on May 7, 2018, which claims priority to Chinese Patent Application No. 2017/10314216.9, filed on May 5, 2017. The disclosures of the aforementioned applications are hereby incorporated by reference in their entireties.

TECHNICAL FIELD

This application relates to the field of wireless communications technologies, and in particular, to a data transmission method, an apparatus, and a system in a wireless communications system.

BACKGROUND

A mobile communications technology has profoundly changed lives of people, but their pursuit of a higher-performance mobile communications technology never stops. To cope with an explosion of mobile data traffic, massive mobile communications device connections, and emerging new services and application scenarios, a 5th generation (5G) mobile communications system comes into being. The 5G mobile communications system needs to support an enhanced mobile broadband (eMBB) service, an ultra-reliable and low-latency communications (URLLC) service, and a massive machine-type communications (mMTC) service.

The URLLC service has an extremely high requirement for a latency. When reliability is not considered, a transmission latency is required to be within 0.5 millisecond (ms). On the premise that reliability of 99.999% is achieved, a transmission latency is required to be within 1 ms. Generally, to meet a high requirement of the URLLC service for reliability, a data packet of the URLLC service needs to be transmitted for a plurality of times. However, to further meet such a strict requirement for a latency, a shorter scheduling unit, for example, a scheduling unit whose duration is only 0.125 ms, needs to be used.

Based on the requirement for reliability, support for transmission of same URLLC service data for a plurality of times is currently considered. However, channel quality of some user equipment (UE) is poor. For example, for UE at a cell edge, a signal-to-noise ratio (SNR) of the UE may be −5 dB. In this signal-to-noise ratio, if reliability of 99.999% needs to be achieved, it is estimated that 8 to 16 transmissions may be required. Assuming that a scheduling unit whose duration is only 0.125 ms is used for URLLC data transmission, a maximum of 8 transmissions can be performed in 1 ms. As a result, it is difficult to meet a requirement for reliability of 99.999% in 1 ms.

SUMMARY

This specification describes a data transmission method, an apparatus, and a system, and aims to flexibly transmit data to user equipment UE by using an access network device to which a coordinating cell belongs, to assist an access network device to which a serving cell belongs in data transmission, thereby improving reliability of data transmission in a low latency scenario.

According to a first aspect, an embodiment of this application provides a data transmission method, including: receiving, by user equipment UE, data from a first access network device to which a serving cell belongs; sending, by the UE, a decoding result of the data to the first access network device and a second access network device to which a coordinating cell belongs; and if the decoding result is negative acknowledgment NACK signaling, receiving, by the UE from the first access network device, the data that is retransmitted, and receiving, by the UE, the data from the second access network device. The second access network device flexibly determines, based on the decoding result fed back by the UE, whether to transmit the data to the UE, to assist the first access network device in transmitting the data to the UE. In this way, in a low latency scenario, the UE may receive data transmitted or retransmitted by a plurality of access network devices, to improve reliability.

In a possible design, the method further includes: sending, by the UE, at least one of resource information or an MCS modulation scheme to the second access network device. In this way, the second access network device may determine, based on information fed back by the UE, a resource for sending or retransmitting the data.

In a possible design, that the sending a decoding result of the data to the first access network device and a second access network device includes: sending, by the UE, the decoding result to the first access network device and the second access network device on a same channel; or sending, by the UE, the decoding result to the first access network device on a first channel, and sending the decoding result to the second access network device on a second channel. A resource is used more economically when the decoding result is fed back on a common channel. Certainly, more information such as resource information or MCS information, can further be flexibly fed back to an access network device on different channels, so that the access network device can determine a resource for transmitting the data.

In a possible design, the UE receives, from the first access network device, the data sent by the first access network device in a time unit K, and the UE receives the data from the second access network device after the time unit K. The time unit K is predefined or preconfigured.

In a possible design, the first access network device to which the serving cell belongs and the second access network device to which the coordinating cell belongs are a same device or different devices. For example, in a multi-antenna scenario, the serving cell and the coordinating cell may correspond to different antenna ports or antenna arrays; or in a carrier aggregation scenario, the serving cell and the coordinating cell may correspond to a primary component carrier and a secondary component carrier. Certainly, this application may also be applied to a scenario in which more than two access network devices provide services for the UE.

In a possible design, the receiving, by UE, data from a first access network device includes: receiving, by the UE, the data from the first access network device in a URLLC time interval; and the receiving, by the UE, the data from the second access network device includes: receiving, by the UE, the data from the second access network device in the URLLC time interval. The URLLC time interval may be a transmission latency of a URLLC service, and may be 1 ms or another time interval. Therefore, data transmission and retransmission are completed within a latency required in URLLC, to improve reliability of data transmission in a low latency scenario of URLLC.

According to a second aspect, an embodiment of this application provides a data transmission method, including: monitoring, by a second access network device, whether user equipment UE has fed back a decoding result, where the decoding result is a result obtained after data received from a first access network device is decoded by the UE, the first access network device is an access network device to which a serving cell of the UE belongs, and the second access network device is an access network device to which a coordinating cell of the UE belongs; and determining, by the second access network device based on a monitoring result, whether to send the data to the UE. The second access network device flexibly determines, based on the decoding result fed back by the UE, whether to transmit the data to the UE, to assist the first access network device in transmitting the data to the UE. In this way, in a low latency scenario, the UE may receive data transmitted or retransmitted by a plurality of access network devices, to improve reliability.

In a possible design, the determining, by the second access network device based on a monitoring result, whether to send the data to the UE includes: if the second access network device does not receive acknowledgment ACK signaling from the UE, sending the data to the UE; or if the second access network device receives acknowledgment ACK signaling from the UE, skipping sending the data to the UE. The access network device determines, based on the ACK signaling fed back by the UE, whether to send or retransmit the data to the UE. In this way, flexible data transmission is implemented.

In a possible design, the determining, by the second access network device based on a monitoring result, whether to send the data to the UE includes: if the second access network device receives negative acknowledgment NACK signaling from the UE, sending the data to the UE; or if the second access network device does not receive NACK signaling from the UE, skipping sending the data to the UE. The access network device determines, based on the NACK signaling fed back by the UE, whether to send or retransmit the data to the UE. In this way, flexible data transmission is implemented.

In a possible design, the second access network device and the first access network device first access network device receive, on a same channel, the decoding result fed back by the UE; or the second access network device and the first access network device receive, on different channels, the decoding result fed back by the UE. A resource is used more economically when the decoding result is received on a common channel. Certainly, more information such as resource information or MCS information, can further be flexibly received on different channels, so that the access network device can flexibly determine a resource for transmitting the data.

In a possible design, the second access network device further receives at least one of resource information and MCS modulation information from the UE, and the second access network device determines, based on the at least one of the resource information and the MCS modulation information, a resource used for sending the data to the UE.

In a possible design, the monitoring, by a second access network device, whether user equipment UE has fed back a decoding result includes: monitoring, by the second access network device in a time unit K, whether the UE has fed back the decoding result, and if the second access network device determines to send the data to the UE, the method includes: sending, by the second access network device, the data to the UE after the time unit K. K is predefined or preconfigured. The second access network device does not indefinitely monitor whether the UE has fed back the decoding result. Therefore, herein, a time unit is predefined or preconfigured, and the second access network device monitors, in the time unit, whether the UE has fed back the decoding result. If the second access network device determines that the data needs to be sent to the UE, the second access network device sends the data to the UE after the time unit.

In a possible design, the first access network device and the second access network device are a same device or different devices. This application may be applied to not only the foregoing radio access network devices, but also a carrier aggregation (CA) scenario, a spatial multiplexing scenario, a coordinated beamforming scenario, and a terminal cooperative communication (D2D) scenario.

In a possible design, the first access network device sends the data to the UE in a URLLC time interval, and the second access network device sends the data to the UE in the URLLC time interval. The URLLC time interval may be a transmission latency of a URLLC service, and may be 1 ms or another time interval. In this way, data transmission and retransmission are completed within a latency required in URLLC, to improve reliability of data transmission in a low latency scenario of URLLC.

According to a third aspect, this application provides a data transmission method, where UE sends data to a first access network device to which a serving cell belongs and a second access network device to which a coordinating cell belongs, and the second access network device may send the data to the first access network device. In this way, the first access network device receives the data sent or retransmitted by the UE and the second access network device, thereby improving reliability of data transmission in a low latency scenario.

According to a fourth aspect, an embodiment of this application provides UE, where the UE has a function of implementing behavior of the UE in the foregoing methods. The function may be implemented by using hardware, or may be implemented by hardware executing corresponding software. The hardware or the software includes one or more modules corresponding to the foregoing function. The module may be software and/or hardware.

In a possible design, a structure of the UE includes a receiver and a transmitter. The receiver is configured to receive data from a first access network device to which a serving cell belongs, and the transmitter is configured to send a decoding result of the data to the first access network device and a second access network device to which a coordinating cell belongs. If the decoding result is negative acknowledgment NACK signaling, the receiver is configured to receive, from the first access network device, the data that is retransmitted, and receive the data from the second access network device. The UE further includes a processor, configured to support the UE in performing a corresponding function in the foregoing methods.

According to a fifth aspect, an embodiment of this application provides a device, where the device has a function of implementing behavior of the access network device in the foregoing methods. The function may be implemented by using hardware, or may be implemented by hardware executing corresponding software. The hardware or the software includes one or more modules corresponding to the foregoing function.

In a possible design, a structure of the access network device includes a processor, a receiver, and a transmitter. The processor is configured to support an access network device in performing a corresponding function in the foregoing methods. The receiver is configured to monitor whether user equipment has fed back a decoding result, where the decoding result is a result obtained after data received from a first access network device is decoded by the UE. The first access network device is an access network device to which a serving cell of the UE belongs, and a second access network device is an access network device to which a coordinating cell of the UE belongs. The processor determines, based on a monitoring result, whether the transmitter is to send the data to the UE. The access network device may further include a memory, where the memory is configured to be coupled to the processor, and the memory stores a program instruction and data that are necessary for the access network device.

In a possible design, a structure of the access network device includes a processor, a receiver, and a transmitter. The processor is configured to support an access network device in performing a corresponding function in the foregoing methods. The receiver is configured to receive data sent by UE, and the receiver is further configured to receive the data sent by another access network device. The network access device may further include a memory, where the memory is configured to be coupled to the processor, and the memory stores a program instruction and data that are necessary for the access network device.

According to a sixth aspect, an embodiment of this application provides a communications system, where the system includes the one or more access network devices and the UE according to the foregoing aspects.

According to a seventh aspect, an embodiment of this application provides a computer storage medium, where the computer storage medium is configured to store computer software instructions used by the foregoing UE, and the computer software instructions include a program designed to perform the foregoing aspects.

According to an eighth aspect, an embodiment of this application provides a computer storage medium, where the computer storage medium is configured to store computer software instructions used by the foregoing access network device, and the computer software instructions include a program designed to perform the foregoing aspects.

According to a ninth aspect, this application provides a chip system, where the chip system includes a processor, configured to support user equipment UE in implementing a function in the foregoing aspects, for example, generating or processing data and/or information in the foregoing methods. In a possible design, the chip system further includes a memory, where the memory is configured to store a program instruction and data that are necessary for the user equipment UE. The chip system may include a chip, or may include a chip and another discrete device.

According to a tenth aspect, this application provides a chip system, where the chip system includes a processor, configured to support an access network device in implementing a function in the foregoing aspects, for example, receiving or processing data and/or information in the foregoing methods. In a possible design, the chip system further includes a memory, where the memory is configured to store a program instruction and data that are necessary for the access network device. The chip system may include a chip, or may include a chip and another discrete device.

According to an eleventh aspect, a computer program product including an instruction is provided, where when the computer program product is run on a computer, the computer is enabled to perform the method according to any one of the foregoing aspects or the possible implementations of the foregoing aspects.

According to the solutions provided in the embodiments of this application, reliability of data transmission can be improved.

BRIEF DESCRIPTION OF THE DRAWINGS

The following describes in more details the embodiments of this application with reference to accompanying drawings.

DETAILED DESCRIPTION OF ILLUSTRATIVE EMBODIMENTS

The following clearly and completely describes the technical solutions in the embodiments of this application with reference to the accompanying drawings in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that as the network architecture evolves and a new service scenario emerges, the technical solutions provided in the embodiments of this application are also applicable to similar technical problems.

The technologies described in embodiments of the present invention may be applied to a long term evolution (LTE for short) system or other wireless communications systems that use various radio access technologies, for example, systems that use access technologies such as code division multiple access, frequency division multiple access, time division multiple access, orthogonal frequency division multiple access, and single carrier frequency division multiple access. In addition, the technologies described in embodiments of the present invention may also be applied to subsequent evolved systems of the LTE system, for example, a 5th generation 5G system and a subsequent evolved system.

Figure 1:
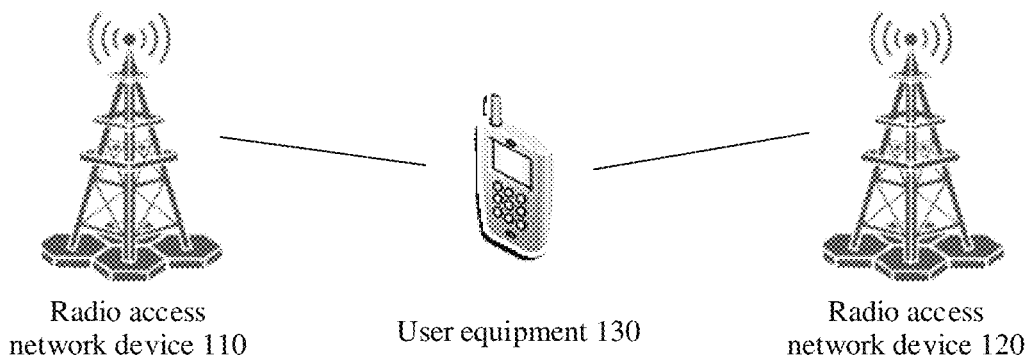
FIG. 1 is a schematic diagram of a possible application scenario according to this application.

FIG. 1 is a schematic diagram of a possible application scenario according to this application. A system in the application scenario includes a radio access network device no, user equipment (UE) 130, and a radio access network device 120.

The user equipment (UE) 130 accesses a network side device through a radio interface for communication, or may perform communication, for example, communication in a device-to-device (D2D) or machine-to-machine (M2M) scenario, with another user equipment. The user equipment in this application may include various handheld devices, vehicle-mounted devices, wearable devices, computing devices, or control devices that have a wireless communication function, another processing device connected to a wireless modem, and UE in various forms, including a mobile station (MS), a terminal, terminal equipment, or the like. For ease of description, in this application, all the devices mentioned above are collectively referred to as user equipment (UE).

A radio access network device may communicate with the user equipment, or may perform communication, for example, communication between a macro base station and an access point, with another network side device. In this application, the radio access network device no may communicate with the radio access network device 120. The radio access network device is an access device used by a terminal device to access a mobile communications system in a wireless manner. The radio access network device may be a NodeB, an evolved NodeB (eNodeB), a base station in a 5G mobile communications system, a base station in a future mobile communications system, a transmission reception point (TRP), an access node in a Wi-Fi system, or the like. A specific technology and a specific device form used by the radio access network device are not limited in the embodiments of this application.

The radio access network device and the user equipment may be deployed on land, including indoors or outdoors, handheld, or vehicle-mounted; or may be deployed on water; or may be deployed on an airplane, a balloon, or a satellite in the air. Application scenarios of the radio access network device and the user equipment are not limited in the embodiments of this application.

FIG. 1 is merely a schematic diagram. The system may further include other network devices such as a core network device, a wireless relay device and a wireless backhaul device, which are not shown in FIG. 1.

In FIG. 1, the radio access network device no is an access network device to which a serving cell of the UE 130 belongs, and the radio access network device 120 is an access network device to which a coordinating cell of the UE 130 belongs. Optionally, the radio access network device no and the radio access network device 120 are connected to a controller/scheduler, and data to be transmitted to the UE 130 may be transmitted to the radio access network device no and the radio access network device 120 by using the controller/scheduler. Alternatively, there is an interface between the radio access network device no and the radio access network device 120 for data exchange. To be specific, the radio access network device no and the radio access network device 120 are connected by using a backhaul line. The backhaul line may be an ideal backhaul, or may be a non-ideal backhaul. The backhaul may be an optical fiber connection, a cable connection, or a wireless connection. This is not limited in this application.

In this application, the radio access network device no to which the serving cell of the UE 130 belongs sends data to the UE. The UE performs decoding after receiving the data, and feeds back a decoding result to the radio access network device no and the radio access network device 120 to which the coordinating cell belongs. If the decoding result includes negative acknowledgment NACK signaling, or the radio access network device 120 does not receive acknowledgment ACK signaling, the radio access network device 120 sends data to the UE, where the data and the data that is sent by the radio access network device no to the UE may belong to a same transport block or a same process. In this way, the access network device to which the coordinating cell of the UE belongs sends, by using a coordinated multi-point transmission technology, the data to the UE based on the decoding result fed back by the UE, thereby ensuring that the data can be transmitted to the UE for more times within a same time. Especially in a case of a low latency of a URLLC service, multi-point transmission can effectively improve reliability.

It should be noted that embodiments of the present invention may be applied to not only the foregoing radio access network devices, but also a carrier aggregation (CA) scenario, a spatial multiplexing scenario, a coordinated beamforming scenario, a terminal cooperative communication (D2D) scenario, and the like. In these scenarios, a first access network device no to which the serving cell belongs corresponds to a primary component carrier, a first group of antenna ports, a primary beam, a primary serving cell, or a primary terminal device, and a second access network device to which the coordinating cell belongs corresponds to a secondary component carrier, a remaining group of antenna ports, a secondary beam, and a coordinating terminal device. To be specific, there may be one or more radio access network devices that provide services for the UE. For example, the radio access network device to which the serving cell belongs and the radio access network device to which the coordinating cell belongs may be one device. For example, in a multi-antenna scenario, the serving cell and the coordinating cell may correspond to different antenna ports or antenna arrays; or in a carrier aggregation scenario, the serving cell and the coordinating cell may correspond to a primary component carrier and a secondary component carrier. Alternatively, there may be more than two radio access network devices that provide services for the UE. This is not limited in this application.

The technical solutions provided in this application may be applied to uplink data transmission and/or downlink data transmission. For uplink data transmission, a data sending device may be user equipment, and a data receiving device may be a network side device, such as a base station. For downlink data transmission, a data sending device may be a network side device, such as a base station, and a data receiving device may be user equipment.

The following explains general concepts or definitions in the embodiments of this application. It should be noted that, some English abbreviations in this specification are used to describe the embodiments of this application by using an LTE system as an example, and may change with evolution of a network. For specific evolution, refer to description in a corresponding standard.

The "data" described in this application generally means service data, but may also include content, such as signaling and a message, needing to be transmitted by a system, for example, a reference signal and an uplink/downlink control information.

The term "and/or" in this application describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The following describes in more details the solutions provided in the embodiments of this application with reference to the accompanying drawings.

Figure 2:
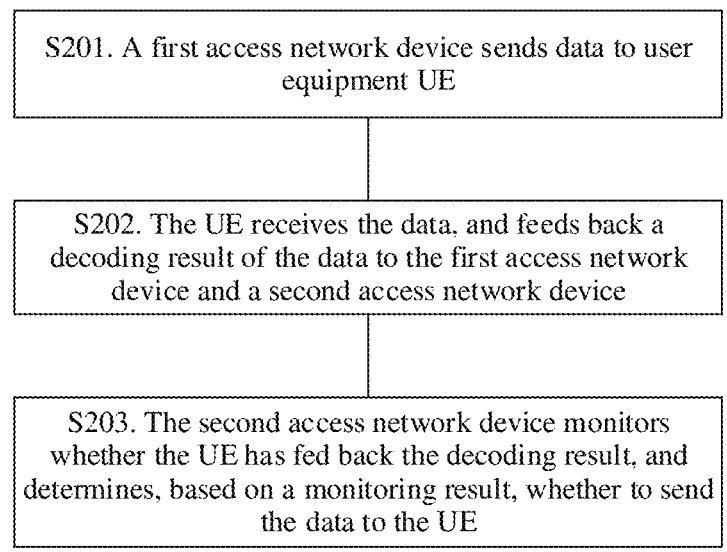
FIG. 2 is a schematic flowchart of a data transmission method according to this application.

FIG. 2 is a schematic flowchart of a data transmission method according to an embodiment of this application. The method is applied to a system that includes user equipment UE, a first access network device to which a serving cell of the UE belongs, and a second access network device to which a coordinating cell of the UE belongs.

S201. The first access network device to which the serving cell belongs sends data to the user equipment UE.

The data may be separately sent to the UE, or may be sent to the UE with a downlink control indication (DCI), or may be sent to the UE without a DCI for scheduling. The first access network device may transmit the data for a single time, or may transmit the data for a plurality of consecutive or inconsecutive times. This is not limited in this application.

Optionally, the first access network device sends the data to the UE in a time unit K.

S202. The UE receives the data, and feeds back a decoding result of the data to the first access network device to which the serving cell belongs and the second access network device to which the coordinating cell belongs.

Specifically, the decoding result fed back by the UE may be acknowledgment ACK signaling or negative acknowledgment NACK signaling. The UE may feed back the decoding result to the first access network device and the second access network device on a same channel. For example, the UE may feed back the decoding result on a common channel. Alternatively, the UE may feed back the decoding result to the first access network device and the second access network device on different channels. For example, the UE may feed back the decoding result to the access network devices on their respective dedicated channel of the access network devices.

The UE feeds back the decoding result to the first access network device and the second access network device on the common channel. The common channel is a channel on which the first access network device and the second access network device may monitor/receive feedback of the UE, and may be a physical uplink control channel (PUCCH), or a physical uplink shared channel (PUSCH) or another channel. This is not limited in this application. A resource of the common channel may be predefined in a protocol; or may be negotiated between access network devices; or may be configured by a transmit end by using higher layer signaling (for example, a master information block (MIB) message, a system information block (SIB) message, radio resource control (RRC) signaling, or a media access control control element (MAC CE)); or may be notified by using L1 layer signaling. The resource may be allocated by a first device to the UE. Herein, the first device is used as a transmit end, and the UE is used as a receive end. The transmit end sends a DCI to the receive end, and the receive end determines the resource based on a control channel element (CCE) index in the DCI. Alternatively, the transmit end notifies the receive end of channel resource information by using a DCI. Alternatively, the transmit end performs allocation by using both radio resource control (RRC) and a DCI. To be specific, the transmit end configures a resource set by using RRC, and notifies the UE of a specific value in the set by using the DCI. There may be another allocation manner. The resource may be time domain information, and/or frequency domain information, and/or space domain information, and/or orthogonal cover code (OCC) information, and/or cyclic shift CS (CS) information. The time domain information may include a start number of a slot/mini-slot/symbol, and/or a specific number of a time unit, and/or a length of the time unit.

The UE feeds back the decoding result to the first access network device and the second access network device on different channels. The different channels are two different channels. The resource may be allocated by each of the first access network device and the second access network device. Herein, the first access network device and the second access network device each are used as a transmit end, and the UE is used as a receive end. The transmit end sends a DCI to the receive end, and the receive end determines the resource based on a CCE index in the DCI. Alternatively, the transmit end notifies the receive end of channel resource information by using a DCI. Alternatively, the transmit end performs allocation by using both RRC and a DCI. To be specific, the transmit end configures a resource set by using RRC, and notifies the UE of a specific value in the set by using the DCI. There may be another allocation manner. The resource may be time domain information, and/or frequency domain information, and/or space domain information, and/or OCC information, and/or CS information. The time domain information may include a start number of a slot/mini-slot/symbol, and/or a specific number of a time unit, and/or a length of the time unit. Alternatively, the resource may be predefined or pre-allocated by using higher layer signaling.

Optionally, the UE may further feed back resource information and/or a modulation and coding scheme (MCS) to the second access network device. The resource information may be frequency domain information such as resource block RB information, and/or time domain information such as information about a time unit, and/or space domain information.

S203. The second access network device to which the coordinating cell belongs monitors whether the UE has fed back the decoding result, and determines, based on a monitoring result, whether to send the data to the UE.

That the second access network device determines, based on a monitoring result, whether to send the data to the UE may be one of the following cases:

(1) If the second access network device receives acknowledgment ACK signaling fed back by the UE, the second access network device does not send the data to the UE; or if the second access network device does not receive acknowledgment ACK signaling fed back by the UE, the second access network device sends the data to the UE.

Specifically, after the data arrives at the first access network device and the second access network device, or after data scheduling starts (e.g., a TTI in which scheduling signaling is located, a slot in which scheduling signaling is located, a mini-slot in which scheduling signaling is located, or a symbol in which scheduling signaling is located starts), or after data transmission starts (To be specific, a TTI in which data is located, or a slot in which data is located, or a mini-slot in which data is located, or a symbol in which data is located starts), or after a reference time (for example, the $0^{th}$ subframe, the $0^{th}$ mini-slot, the $0^{th}$ slot, the $0^{th}$ TTI, or the $0^{th}$ symbol) that is configured/defined in a protocol starts, the first access network device sends the data to the UE in a time unit K, and the second access network device monitors a common channel or a dedicated channel in the time unit K. If the second access network device detects acknowledgment (ACK) signaling fed back by the UE, the second access network device does not send the data to the UE; or if the second access network device does not detect acknowledgment ACK signaling fed back by the UE, the second access network device sends the data to the UE. The data sent by the second access network device to the UE and the data that is sent by the first network device to the UE may belong to a same transport block or a same process.

The time unit K may be predefined; or may be configured by using signaling, for example, a master information block (MIB) message, a system information block (SIB) message, radio resource control (RRC) signaling, or a media access control control element (MAC CE), L1 layer signaling, or any combination of the foregoing signaling. For example, K may be 0.5 ms; or may be a time required by the UE to receive the data and complete decoding; or may be a time interval between a moment when a transmit end device starts to schedule the data and a moment when a receive end device feeds back the decoding result; or may be another value. K may be in a unit of TTI, slot, mini-slot, symbol, ms, sampling point, or the like. This is not limited in this application. For a subsequent definition of K, refer to the foregoing description, and details are not described again.

(2) If the second access network device receives negative acknowledgment NACK signaling sent by the UE, the second access network device sends the data to the UE; or if the second access network device does not receive NACK signaling sent by the UE, the second access network device does not send the data to the UE.

Optionally, after the data arrives at the first access network device and the second access network device, or after data scheduling starts (e.g., a TTI in which scheduling signaling is located, a slot in which scheduling signaling is located, a mini-slot in which scheduling signaling is located, or a symbol in which scheduling signaling is located starts), or after data transmission starts (e.g., a TTI in which data is located, or a slot in which data is located, or a mini-slot in which data is located, or a symbol in which data is located starts), or after a reference time (for example, the $0^{th}$ subframe, the $0^{th}$ mini-slot, the $0^{th}$ slot, the $0^{th}$ TTI, or the $0^{th}$ symbol) that is configured/defined in a protocol starts, the first access network device sends the data to the UE in a time unit K, and the second access network device monitors a common channel or a dedicated channel in the time unit K. If the second access network device detects, in the time unit K, negative acknowledgment (NACK) signaling fed back by the UE, the second access network device sends the data to the UE; or if the second access network device does not detect, in the time unit K, negative acknowledgment NACK signaling fed back by the UE, the second access network device does not send the data to the UE. The data and data that is sent by the first device to the UE may belong to a same transport block or a same process.

Alternatively, the second access network device monitors a common channel or a dedicated channel. If the second access network device detects negative acknowledgment NACK signaling fed back by the UE, the second access network device sends the data to the UE; or if the second access network device does not detect negative acknowledgment NACK signaling fed back by the UE, the second access network device does not send the data to the UE. That is, optionally, the second access network device may not be restricted to monitoring a channel in a time unit K.

If the second access network device determines to send the data to the UE, optionally, the second access network device sends the data to the UE after the time unit K. This is not limited in this application. The second access network device sends the data to the UE. The second access network device may transmit the data to the UE for a single time, or may transmit the data to the UE for a plurality of consecutive or inconsecutive times. The second access network device may transmit only the data to the UE, or may transmit the data and DCI signaling to the UE.

For the first access network device to which the serving cell belongs, the first access network device also receives the decoding result fed back by the UE, and determines, based on the decoding result, whether to send the data to the UE. If the first access network device determines to send the data, the first access network device may transmit the data for a single time, or may transmit the data to the UE for a plurality of consecutive or inconsecutive times. The first access network device may transmit only the data to the UE, or may transmit the data and DCI signaling to the UE. Alternatively, the first access network device retransmits the data to the UE for a plurality of consecutive or inconsecutive times. This is not limited in this application.

Optionally, if the second access network device determines to send the data to the UE, the second access network device may send the data to the UE based on a preconfigured resource; or the second access network device further receives at least one of resource information and an MCS modulation and coding scheme that are fed back by the UE, where the resource information and the MCS that are fed back by the UE may be a same or related resource and same or related MCS information that are used by the first device to transmit the data to the UE in S201. The second access network device to which the coordinating cell belongs determines, based on at least one of the resource information and the MCS, a resource used for sending the data to the UE, and sends the data to the UE by using the resource. An optional resource determining manner is: some or all of resource information used by the second access network device to determine the resource is the same as the resource information fed back by the UE; or some or all of MCS information used by the second access network device to determine the resource is the same as the MCS fed back by the UE; or some or all of resource information used by the second access network device to determine the resource is the same as the resource information fed back by the UE, and some or all of MCS information used by the second access network device to determine the resource is the same as the MCS fed back by the UE. Alternatively, resource information and/or MCS information used by the second access network device to determine the resource are obtained according to another rule (the rule may be predefined or preset). This is not limited in this application.

In this embodiment of this application, according to a coordinated multi-point transmission method, the second access network device to which the coordinating cell belongs monitors the UE, obtains the decoding result fed back by the UE, and determines, based on the decoding result, whether to transmit the data to the UE. In this way, it can be ensured that the data is transmitted to the UE for a plurality of times within a same time, thereby improving reliability of data transmission in a low latency scenario. Whether the coordinating cell coordinates is based on the decoding result fed back by the UE, thereby avoiding unnecessary coordination and improving communication efficiency.

Figure 3:
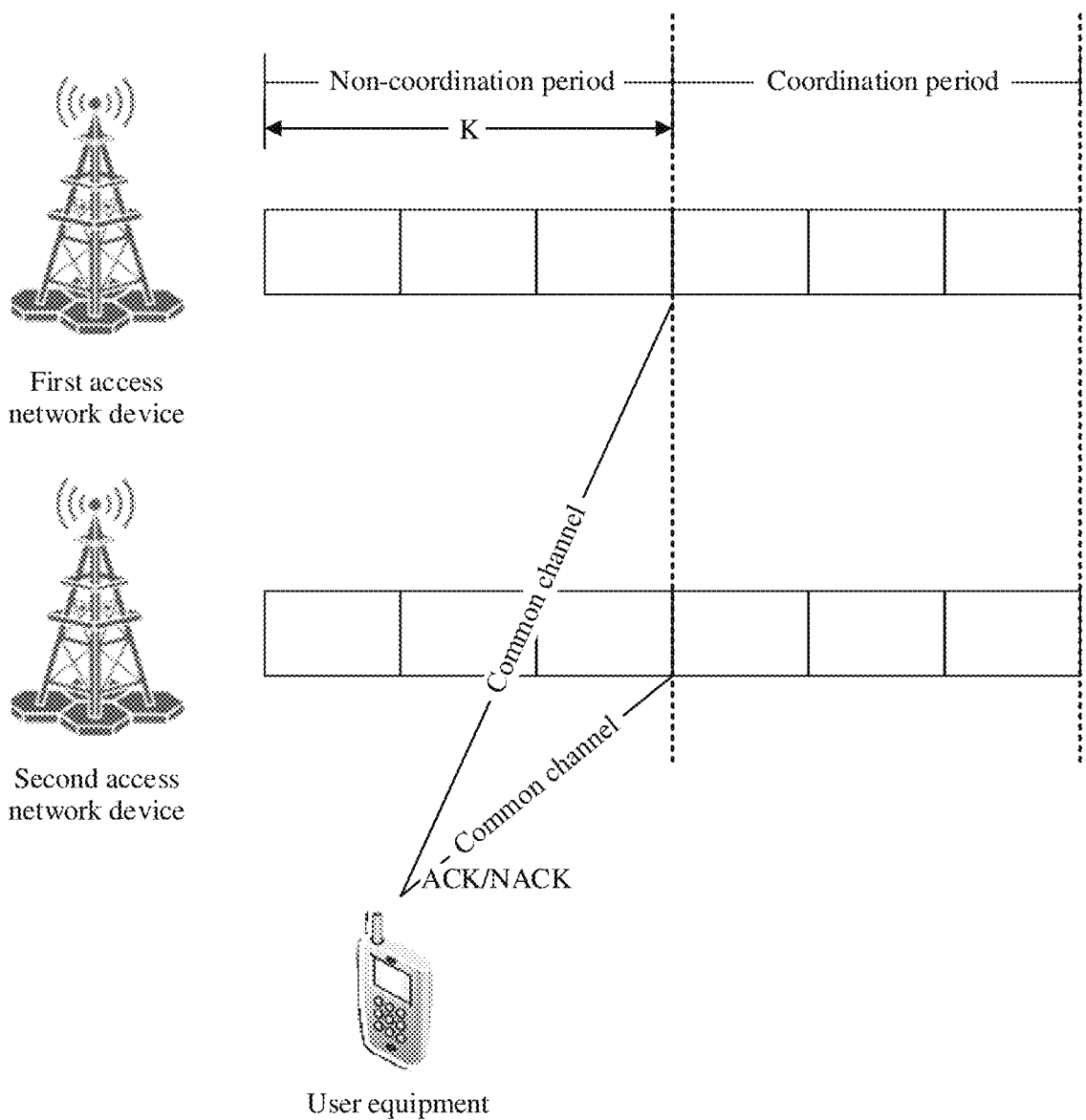
FIG. 3 is a schematic diagram of a data transmission method according to this application.

FIG. 3 is a schematic diagram of a data transmission method according to an embodiment of this application.

This embodiment of this application shown in FIG. 3 relates to a first access network device to which a serving cell belongs, a second access network device to which a coordinating cell belongs, and UE.

Optionally, the first access network device and the second access network device may use a centralized radio access network (C-RAN) architecture. To be specific, the first access network device and the second access network device are connected by a central controller/scheduler. Data is sent to the first access network device and the second access network device by using the central controller/scheduler. Alternatively, there is an interface between the first access network device and the second access network device for information exchange. To be specific, the first access network device and the second access network device are connected by using a backhaul backhaul line. A backhaul may be an optical fiber connection, a cable connection, or a wireless connection, and may be an ideal backhaul or a non-ideal backhaul. This is not limited in this application.

This embodiment of the present invention relates to downlink communication. URLLC data arrives at the first access network device and the second access network device at a same moment. In this embodiment, the first access network device and the second access network device may be synchronized. To be specific, the first access network device and the second access network device learn that the UE may transmit data in a time unit, or the second access network device learns that the UE may feed back information in a time unit.

S301. The first access network device sends the data to the UE.

Specifically, the data may be scheduled based on L1 signaling. For example, a transmit end sends DCI scheduling information and corresponding data to a receive end. Alternatively, a resource for sending the data may be scheduled or allocated based on higher layer signaling. For example, after the transmit end configures a resource for data transmission by using RRC or other higher layer signaling, the transmit end sends the data on the configured resource, and the receive end receives the data on the configured resource. In this manner, physical layer signaling may not need to be sent to the receive end. Alternatively, a resource for sending the data may be configured based on semi-persistent scheduling. For example, after the transmit end configures a resource for data transmission by using RRC or other higher layer signaling, the transmit end may activate or deactivate, by using physical layer signaling, sending of data on the configured resource (the data may be periodically sent), and the receive end receives the data on the configured resource. The data may be separately sent to the UE, or may be sent to the UE with a downlink control indication (DCI).

Optionally, the first access network device may transmit the data for a single time, or transmit the data for a plurality of consecutive or inconsecutive times. MCSs of the data transmitted for the plurality of times may be the same, partially different, or completely different; resources of the data transmitted for the plurality of times may be the same, partially different, or completely different; and redundancy versions (RV) of the data transmitted for the plurality of times may be the same, partially different, or completely different. This is not limited in this application.

The first access network device may send the data to the UE in a time unit K for a single time or for a plurality of consecutive or inconsecutive times.

S302. The UE may feed back a decoding result to the first access network device and the second access network device on a common channel.

To be specific, if the UE correctly performs decoding, the UE sends acknowledgment (ACK) signaling to the second access network device; or if the UE fails to perform decoding, the UE sends negative acknowledgment (NACK) signaling to the second access network device.

The UE feeds back the decoding result to the first access network device and the second access network device on the common channel. The common channel is a channel on which both the first access network device and the second access network device may monitor/receive feedback of the UE, and may be a physical uplink control channel (PUCCH), a physical uplink shared channel (PUSCH), or the like. This is not limited in this application.

A resource of the common channel may be predefined in a protocol; or may be negotiated between access network devices; or may be configured by using higher layer signaling (for example, a master information block (MIB) message, a system information block (SIB) message, radio resource control (RRC) signaling, or a media access control control element (MAC CE)); or may be notified by using $L_1$ layer signaling. For example, the resource may be allocated by a first device to the UE. Herein, the first device is used as a transmit end, and the UE is used as a receive end. The transmit end sends a DCI to the receive end, and the receive end determines the resource based on a CCE index in the DCI. Alternatively, the transmit end notifies the receive end of channel resource information by using a DCI. Alternatively, the transmit end performs allocation by using both RRC and a DCI. To be specific, the transmit end configures a resource set by using RRC, and notifies the UE of a specific value in the set by using the DCI. There may be another allocation manner. The resource may be time domain information, and/or frequency domain information, and/or OCC information, and/or CS information. The time domain information may include a start number of a slot/mini-slot/symbol, and/or a specific number of a time unit, and/or a length of the time unit. In this way, the UE determines the resource of the common channel, and feeds back the decoding result on the common channel.

S303. The second access network device monitors the common channel.

The second access network device monitors the common channel in the time unit K. To be specific, the second access network device monitors the channel in a non-coordination period in FIG. 3.

The time unit K may be predefined, or may be configured by using signaling. For example, K may be 0.5 ms; or may be a time required by the UE to receive the data and complete decoding; or may be a time interval between a moment when a transmit end device starts to schedule the data and a moment when a receive end device feeds back the decoding result. This is not limited in this application.

If the second access network device does not receive the acknowledgment (ACK) signaling, the second access network device sends the data to the UE on a preconfigured resource; or if the second access network device receives the ACK signaling, the second access network device does not send the data to the UE.

A resource used by the second access network device to transmit the data may be preconfigured. For example, the resource may be configured by using higher layer signaling (for example, a master information block (MIB) message, a system information block (SIB) message, radio resource control (RRC) signaling, or a media access control control element (MAC CE)). The resource may be time domain information, and/or frequency domain information, and/or space domain information, and/or OCC information, and/or CS information. The time domain information may include a start number of a slot/mini-slot/symbol, and/or a specific number of a time unit, and/or a length of the time unit. The space domain information may include one of a layer, a precoding matrix, a transmission mode, and a transmission policy.

The second access network device sends the data to the UE after the time unit K.

S304. The UE receives the data retransmitted by the first access network device to the UE, and receives, on the preconfigured resource, the data sent by the second access network device.

Specifically, for transmission of the data, refer to related content in step S301, and details are not described herein.

In this embodiment of this application, the second access network device to which the coordinating cell belongs flexibly transmits the data to the UE based on the decoding result of the UE, to assist the first access network device to which the serving cell belongs in transmitting the data to the UE. The data is transmitted by using a coordinated multi-point transmission technology, thereby improving reliability of data transmission in a low latency scenario.

Figure 4:
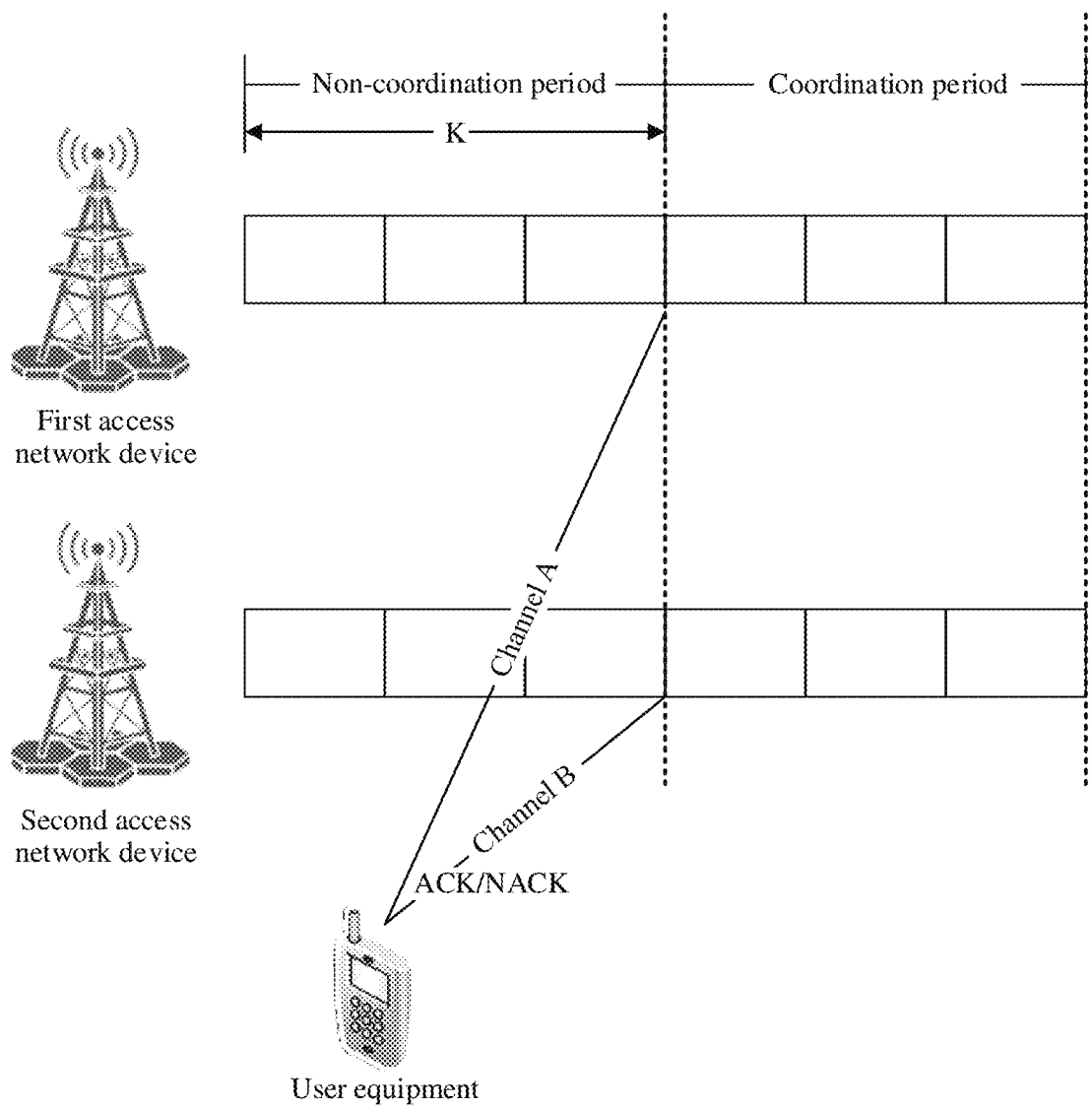
FIG. 4 is a schematic diagram of a data transmission method according to this application.

FIG. 4 is a schematic diagram of a data transmission method according to an embodiment of this application. This embodiment of the present invention relates to a first access network device to which a serving cell belongs, a second access network device to which a coordinating cell belongs, and UE. For related steps in FIG. 4, refer to the steps in FIG. 2 and FIG. 3. Details are not described in this application.

S401. The first access network device sends data to the UE.

S402. The UE feeds back a decoding result to the first access network device and the second access network device on different channels.

To be specific, the UE feeds back the decoding result to the first access network device on a channel A and feeds back the decoding result to the second access network device on a channel B.

Optionally, in addition to the decoding result, the UE may further feed back at least one of resource information or MCS information to the second access network device.

S403. The second access network device monitors the channel B.

If the second access network device receives NACK signaling, the second access network device sends the data to the UE.

If the second access network device does not receive NACK signaling, the second access network device does not send the data to the UE.

Optionally, the second access network device may send the data to the UE based on a preconfigured resource. Alternatively, the second access network device may send the data to the UE based on a resource scheduled by using a DCI. Alternatively, the second access network device may determine a resource based on a received resource allocation information and/or MCS modulation information, and send the data to the UE on the determined resource. For example, a second device determines a resource based on resource block information in a resource block.

S404. After feeding back a NACK, the UE continues to receive the data sent by the first access network device, and receive the data sent by the second access network device.

In this embodiment of this application, the second access network device to which the coordinating cell belongs flexibly transmits the data to the UE based on the decoding result of the UE, to assist the first access network device to which the serving cell belongs in transmitting the data to the UE. The data is transmitted by using a coordinated multi-point transmission technology, thereby improving reliability of data transmission in a low latency scenario.

Figure 5:
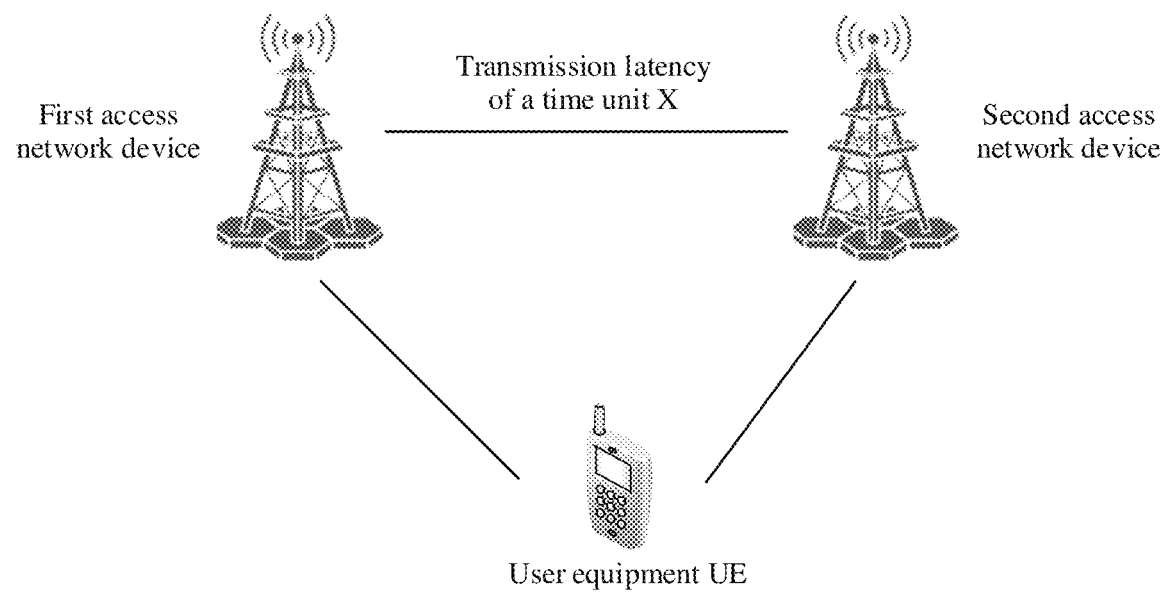
FIG. 5 is a schematic diagram of a data transmission method according to this application.

FIG. 5 is a schematic diagram of a data transmission method according to an embodiment of this application. The method is applied to a system that includes user equipment UE, a first access network device to which a serving cell of the UE belongs, and a second access network device to which a coordinating cell of the UE belongs. For related steps and terms in this embodiment, refer to the steps and terms in other embodiments of this application.

S501. The UE sends data to the first access network device and the second access network device.

Optionally, the UE sends the data to both the first access network device and the second access network device in a transmission time interval (TTI) m, where m is a positive integer not less than o.

The UE may send the data to the first access network device and the second access network device on a same channel. A resource of the channel may be predefined in a protocol; or may be negotiated between access network devices; or may be configured by using higher layer signaling, for example, a master information block (MIB) message, a system information block (SIB) message, radio resource control (RRC) signaling, or a media access control control element (MAC CE); or may be notified by using L1 layer signaling. For example, the resource may be allocated by a first device to the UE. Herein, the first device is used as a transmit end, and the UE is used as a receive end. The transmit end sends a DCI to the receive end, and the receive end sends data based on resource information, and/or MCS information, and/or process information in the DCI.

The UE may send the data to the first access network device and the second access network device on different channels. The different channels are two different channels. The resource may be allocated by each of the first access network device and the second access network device. Herein, the first access network device and the second access network device each are used as a transmit end, and the UE is used as a receive end. The transmit end sends a DCI of the transmit end to the receive end, and the receive end sends data based on resource information, and/or MCS information, and/or process information in the DCI of the transmit end.

S502. The second access network device sends the data to the first access network device.

After receiving the data from the UE, the second access network device sends the data to the first access network device. Optionally, the second access network device sends the data to the first access network device over a backhaul link. A transmission latency of transmitting the data by the second access network device to the first access network device is a time unit X(X≥o), and the transmission latency may be in a unit of TTI, slot, mini-slot, symbol, ms, sampling point, or the like. This is not limited in this application.

Optionally, if the second access network device receives acknowledgment ACK signaling fed back by the first access network device e, the second access network device does not send the data to the first access network device and the second access network device.

Optionally, if there is only a time unit X before a moment (for example, a specific TTI/slot/mini-slot/symbol), or after a time unit Q from arrival of the data or beginning of scheduling, the second access network device may not send the data to the first access network device, and the UE may not send the data to the first access network device and the second access network device. Q may be predefined or preconfigured.

S503. The first access network device receives the data, and sends a decoding result of the data to the UE.

Optionally, the first access network device sends the decoding result of the data to the second access network device.

According to this embodiment of this application, the first access network device to which the serving cell belongs can flexibly receive the data transmitted or retransmitted by the UE and the coordinating cell. The data is transmitted by using a coordinated multi-point transmission technology, thereby improving reliability of data transmission in a low latency scenario.

It should be noted that numbers, such as "first" and "second", of symbol sequences in this application are merely for clarity of description, and do not constitute a limitation. Symbol sequences with a same number in different embodiments may be the same or may be different. In the foregoing embodiments provided in this application, the data transmission methods provided in the embodiments of this application each are described from the perspective of each network element and from the perspective of interaction between network elements. It may be understood that, to implement the foregoing functions, the network elements, such as the UE and the access network device, include corresponding hardware structures and/or software modules for performing the functions. A person skilled in the art should be easily aware that units and algorithm steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 6:
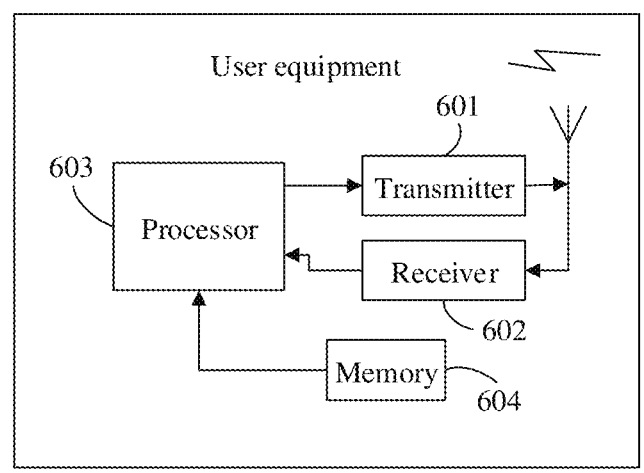
FIG. 6 is a schematic structural diagram of UE according to this application.

FIG. 6 is a possible schematic structural diagram of the user equipment in the foregoing embodiments.

In a possible design, a structure of the UE includes a receiver and a transmitter. The receiver is configured to receive data from a first access network device to which a serving cell belongs, and the transmitter is configured to send a decoding result of the data to the first access network device and a second access network device to which a coordinating cell belongs. If the decoding result is negative acknowledgment NACK signaling, the receiver is configured to receive, from the first access network device, the data that is retransmitted, and receive the data from the second access network device. In a possible example, a structure of the UE may further include a memory. The memory is configured to be coupled to a processor, and store a program instruction and data that are necessary for the UE. The UE further includes a processor, configured to support the UE in performing a corresponding function in the foregoing methods. In the example corresponding to FIG. 6, the structure of the UE in this application includes a transmitter 601, a receiver 602, a processor 603, and a memory 604.

Figure 7:
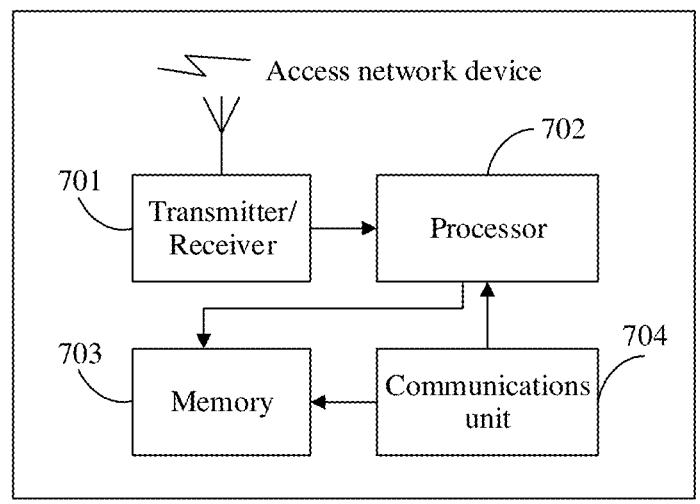
FIG. 7 is a schematic structural diagram of an access network device according to this application.

FIG. 7 is a simplified schematic diagram of a possible design structure of the access network device in the foregoing embodiments.

In a possible design, a structure of the access network device includes a processor, a receiver, and a transmitter. The processor is configured to support the access network device in performing a corresponding function in the foregoing methods. The receiver is configured to monitor whether user equipment has fed back a decoding result, where the decoding result is a result obtained after data received from a first access network device is decoded by the UE. The first access network device is an access network device to which a serving cell of the UE belongs, and a second access network device is an access network device to which a coordinating cell of the UE belongs. The processor determines, based on a monitoring result, whether the transmitter is to send the data to the UE. The access network device may further include a memory, where the memory is configured to be coupled to the processor, and the memory stores a program instruction and data that are necessary for the access network device. The access network device further includes a communications unit, configured to support communication between the access network device and another network side device.

In a possible design, a structure of the access network device includes a processor, a receiver, and a transmitter. The processor is configured to support the access network device in performing a corresponding function in the foregoing methods. The receiver is configured to receive data sent by UE, and the receiver is further configured to receive the data sent by another access network device. The access network device may further include a memory, where the memory is configured to be coupled to the processor, and the memory stores a program instruction and data that are necessary for the access network device. The access network device further includes a communications unit, configured to support communication between the access network device and another network side device.

In an example corresponding to FIG. 7, a structure of the access network device in this application includes a transmitter/receiver 701, a processor 702, a memory 703, and a communications unit 704.

It may be understood that FIG. 6 and FIG. 7 show merely simplified designs of devices. In an actual application, the devices may include any quantity of transmitters, receivers, processors, memories, and the like, and all devices that can implement this application fall within the protection scope of this application.

The processor configured to perform functions of the UE or the access network device in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor.

Methods or algorithm steps described with reference to the content disclosed in this application may be implemented by hardware, or may be implemented by a processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form well-known in the art. For example, a storage medium is coupled to a processor, so that the processor can read information from the storage medium, or write information into the storage medium. Certainly, the storage medium may alternatively be a component of the processor. The processor and the storage medium may be located in an ASIC. In addition, the ASIC may be located in the UE and/or the access network device. Certainly, the processor and the storage medium may alternatively exist in the UE and/or the access network device as discrete components.

A person skilled in the art should be aware that in the foregoing one or more examples, the functions described in this application may be implemented by using hardware, software, firmware, or any combination thereof. When the functions are implemented by using software, the functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A method, comprising:
receiving, by a user equipment (UE), data from a first access network device in a time unit, the time unit being predefined or preconfigured, and a serving cell of the UE belonging to the first access network device:
sending, by the UE, a decoding result of decoding the data to the first access network device and a second access network device, a coordinating cell of the UE belonging to the second access network device; and
in response to the decoding result comprising negative acknowledgment (NACK) signaling:
receiving, by the UE, the data retransmitted from the first access network device; and
receiving, by the UE, the data from the second access network device after the time unit.

2. The method according to claim 1, further comprising:
sending, by the UE to the second access network device, resource information or modulation and coding scheme (MCS) information.

3. The method according to claim 1, wherein sending the decoding result comprises:
sending, by the UE to the first access network device and to the second access network device, the decoding result on a same channel.

4. The method according to claim 1, wherein sending the decoding result comprises:
sending, by the UE to the first access network device on a first channel, the decoding result; and
sending, by the UE to the second access network device on a second channel, the decoding result, the second channel being different from the first channel.

5. The method according to claim 1, wherein the first access network device and the second access network device are different devices.

6. The method according to claim 1, wherein:
receiving the data from the first access network device comprises receiving, by the UE from the first access network device, the data in a ultra-reliable low-latency communication (URLLC) time interval; and
receiving the data from the second access network device comprises receiving, by the UE from the second access network device, the data in the URLLC time interval.

7. A method, comprising:
monitoring, by a second access network device in a time unit, whether a user equipment (UE) has fed back a decoding result, the decoding result having been obtained in response to the UE decoding data received from a first access network device, a serving cell of the UE belonging to the first access network device, a coordinating cell of the UE belonging to the second access network device, and the time unit being predefined or preconfigured;
determining, by the second access network device according to the monitoring of whether the UE has fed back the decoding result, whether to send the data to the UE; and
in response to determining to send the data to the UE, sending, by the second access network device to the UE, the data after the time unit.

8. The method according to claim 7, wherein determining whether to send the data to the UE comprises:
determining to send the data to the UE in response to the second access network device not receiving acknowledgment (ACK) signaling corresponding to the data from the UE, the data.

9. The method according to claim 7, wherein determining whether to send the data to the LIE comprises:
determining to skip sending the data to the UE in response to the second access network device receiving acknowledgment (ACK) signaling corresponding to the data from the UE.

10. The method according to claim 7, wherein determining whether to send the data to the UE comprises:
determining to send the data to the UE in response to the second access network device receiving negative acknowledgment (NACK) signaling corresponding to the data from the UE.

11. The method according to claim 7, wherein determining whether to send the data to the UE comprises:
determining to skip sending the data to the UE in response to the second access network device not receiving negative acknowledgment (NACK) signaling corresponding to the data from the UE.

12. The method according to claim 7, further comprising:
receiving, by the second access network device from the LIE on a first channel, the decoding result fed back by the UE, the first channel being a same channel as or a different channel than a second channel on which the first access network device received the decoding result fed back by the UE.

13. The method according to claim 7, further comprising:
receiving, by the second access network device from the LIE, resource information or modulation and coding scheme (MCS) information; and
determining, by the second access network device according to the resource information or the MCS information, a resource on which to send the data to the UE.

14. The method according to claim 7 wherein the first access network device and the second access network device are a same device.

15. An apparatus, comprising:
a processor; and
a non-transitory memory storing instructions to be executed on the processor, to cause a user equipment (UE) to perform:
receiving data from a first access network device in a time unit, the time unit being predefined or preconfigured, and a serving cell of the UE belonging to the first access network device;
sending a decoding result of decoding the data to the first access network device and a second access network device, a coordinating cell of the UE belonging to the second access network device; and
in response to the decoding result comprising negative acknowledgment (HACK) signaling:

receiving the data retransmitted from the first access network device; and receiving the data from the second access network device after the time unit.

16. The apparatus according to claim 15, wherein the non-transitory memory further stores instructions to be executed by the processor, to cause the UE to perform:

sending, to the second access network device, resource information or modulation or coding scheme (MCS) information.

17. The apparatus according to claim 15, wherein the non-transitory memory stores instructions to be executed by the processor, to cause the UE to perform:

sending the decoding result to the first access network device and the second access network device on a same channel.

* * * * *

UNITED STATES PATENT AND TRADEMARK OFFICE
CERTIFICATE OF CORRECTION

PATENT NO. : 11,018,725 B2
APPLICATION NO. : 16/672840
DATED : May 25, 2021
INVENTOR(S) : Jinlin Peng It is certified that error appears in the above-identified patent and that said Letters Patent is hereby corrected as shown below:

In the Claims

In Claim 9, Column 20; Line 19 delete "LIE" insert --UE--
In Claim 12, Column 20; Line 38 delete "LIE" insert --UE--
In Claim 13, Column 20; Line 45 delete "LIE" insert --UE--
In Claim 15, Column 20; Line 67 delete "(HACK)" insert --(NACK)--

Signed and Sealed this
Seventh Day of September, 2021

Drew Hirshfeld
*Performing the Functions and Duties of the
Under Secretary of Commerce for Intellectual Property and
Director of the United States Patent and Trademark Office*